United States Patent
Umezawa et al.

(10) Patent No.: US 6,335,392 B1
(45) Date of Patent: Jan. 1, 2002

(54) OUTSOLE OF SHOES

(75) Inventors: Ikuko Umezawa, Hyogo; Akihiro Nakahara, Osaka-fu, both of (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 09/405,080

(22) Filed: Sep. 27, 1999

(30) Foreign Application Priority Data

Oct. 21, 1998 (JP) .................................................. 10-300226

(51) Int. Cl.⁷ ...................................................... C08K 5/24
(52) U.S. Cl. ............................................ 524/269; 524/490
(58) Field of Search ................... 524/575, 269, 524/490

(56) References Cited

U.S. PATENT DOCUMENTS

| | | | | |
|---|---|---|---|---|
| 4,048,427 A | * | 9/1977 | Hargis | 526/337 |
| 4,124,546 A | * | 11/1978 | Rubio | 260/5 |
| 4,307,218 A | * | 12/1981 | Bingham | 526/340 |
| 4,436,857 A | * | 3/1984 | Kuan | 524/260 |
| 4,590,123 A | * | 5/1986 | Hashimoto | 428/316.6 |
| 4,603,075 A | * | 7/1986 | Dergarabedian | 428/235 |
| 4,650,831 A | * | 3/1987 | Bond | 525/332.9 |
| 5,254,653 A | * | 10/1993 | Halasa | 526/337 |
| 5,300,577 A | * | 4/1994 | Di Rossi | 525/237 |

FOREIGN PATENT DOCUMENTS

| | | |
|---|---|---|
| JP | A7-177903 | 7/1997 |
| JP | A9-322806 | 12/1997 |

* cited by examiner

*Primary Examiner*—Paul R. Michl
(74) *Attorney, Agent, or Firm*—Birch, Stewart, Kolasch & Birch, LLP (57) ABSTRACT

Base rubber containing 70–100 wt % of styrene-butadiene rubber whose glass transition temperature (Tg) is higher than −33° C. and less than −10 ° C., a vulcanizing agent, and compounding agents added to the base rubber as necessary are kneaded. A mixture obtained by kneading them is put in a forming die. While the mixture is being injection-molded or press-molded, the base rubber is vulcanized to form an outsole.

3 Claims, 6 Drawing Sheets

FIG. 6

OUTSOLE OF SHOES

BACKGROUND OF THE INVENTION

1. Field of the Invention

Generally, the present invention relates to an outsole of shoes. More particularly, the present invention relates to an outsole having high gripping force to obtain superior slip prevention performance even on ground irregular and wet so that the outsole can be used safely and suitably for trekking shoes.

2. Description of the Related Art

The slip prevention performance of shoes is an important capability thereof. Thus, the outsole which is a part of the shoes and contacts the ground is formed of a rubber composition to provide the shoes with slip prevention performance by an adhesive frictional force peculiar to rubber.

When the ground is dry, the outsole formed of the rubber composition has a superior slip prevention performance. But when the ground is wet, for example, on a rainy day or the waterside and the like, the degree of its slip prevention performance deteriorates. Therefore, it is necessary to limit a person's exercise range or the person may turn over in the worst case. This is because when the ground is wet, a water film is present between the outer surface of the outsole and the ground, thus deteriorating the adhesive frictional force therebetween.

To allow the outsole to have slip prevention performance on the wet ground, proposals have been made to form the outsole of a rubber composition containing a material having a high water absorbing percentage so that the outsole absorbs the water present between the outer surface of the outsole and the ground. However, according to the proposal, there is a limitation in the amount of water which can be absorbed by the outsole; and sucked water increases the weight of the shoes, which makes it difficult for the person to walk or take exercise.

Instead of using the material having a high water absorbing percentage, as disclosed in Japanese Patent Application Laid-Open No. 9-322806, there is proposed an outsole made of a rubber composition containing a material having a low water absorbing percentage, namely, 0 wt % or more and 1 wt % or less. The outsole is intended to discharge water present between the outer surface of the outsole and the wet ground to the periphery thereof to a possible highest extent to thereby prevent the outsole from slipping on the wet ground. Although the console is formed of the rubber composition having a low water absorption percentage, the outsole is incapable of providing a satisfactory degree of slip prevention performance for shoes such as trekking shoes used to walk on very irregular ground such as a rocky place when the irregular ground is wet.

As apparent from the above description, it is difficult to provide the outsole to be used for the irregular and wet ground with a high slip prevention performance by means of control of the water absorbing property of the rubber composition composing the outsole. Therefore, it is necessary to enhance the slip prevention performance of the outsole.

SUMMARY OF THE INVENTION

The present invention has been made in view of the above-described situation. Thus, it is an object of the present invention to provide an outsole having preferable slip prevention performance by improving the ground-gripping performance thereof even for ground very irregular and wet.

In the present invention, an outsole of shoes is comprising molded vulcanized rubber material which contains base rubber. The base rubber contains 70–100 wt % of styrene-butadiene rubber whose glass transition temperature (Tg) is higher than −33° C. and less than −10° C.

DETAILED DESCRIPTION OF THE PREFERRED EMBODIMENTS

Figure 5:
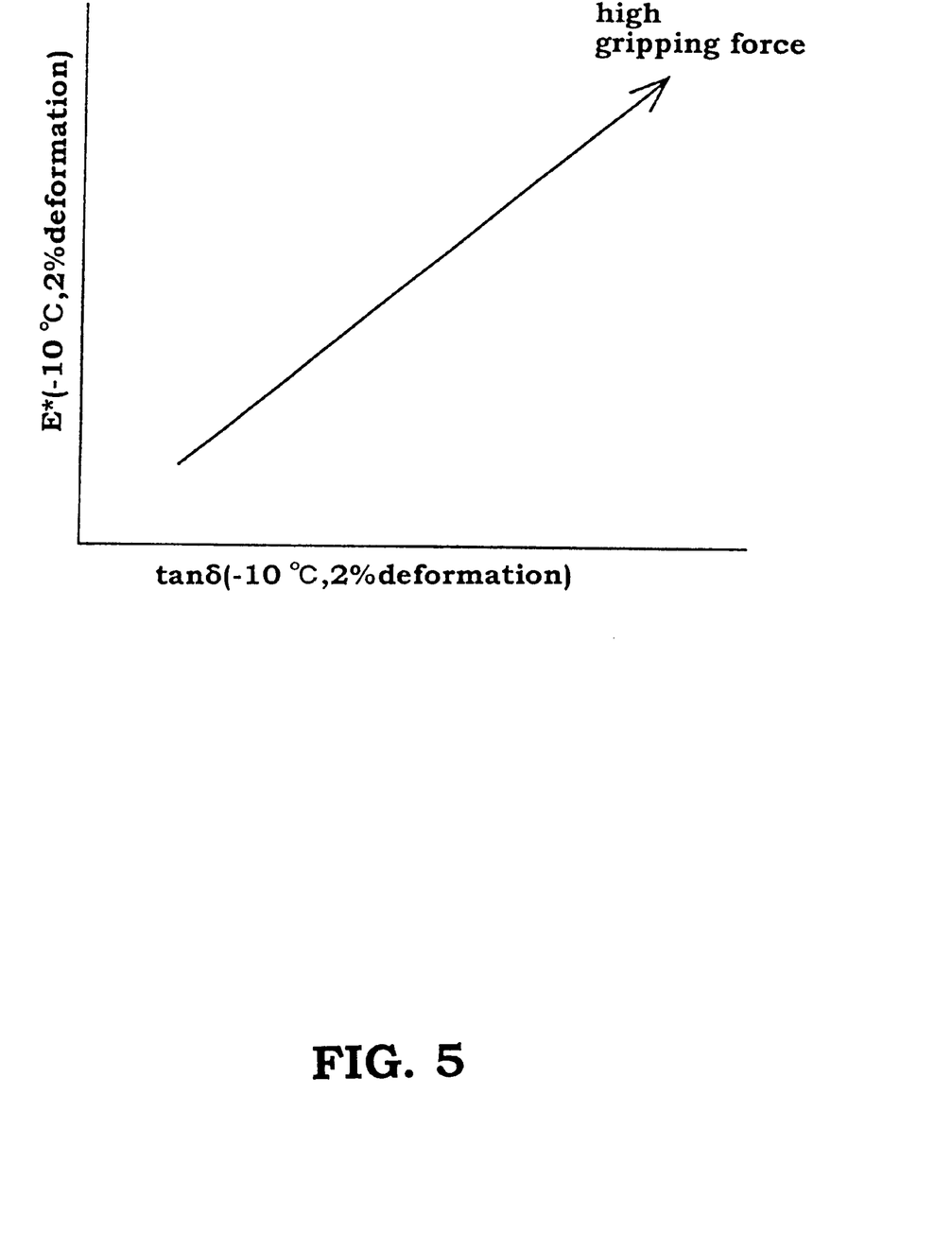
FIG. 5 shows the relationship between the slip prevention performance of an outsole formed of a vulcanized rubber composition and the loss factor (tan δ) thereof as well as the complex elastic modulus (E*) thereof at −10° C. and at a dynamic deformation of 2.0% in strain dispersion of dynamic viscoelasticity at a frequency of 10 Hz.

In order to solve the problem, the present inventors have examined the relationship between the slip prevention performance of an outsole of shoes formed of a molded vulcanized rubber at wet rocky ground and a viscoelastic behavior thereof. As a result, they have obtained a knowledge that as shown in FIG. 5, in the strain dispersion of dynamic viscoelasticity of vulcanized rubber at a frequency of 10 Hz, as its loss factor (tan δ) and complex elastic modulus (E*) become greater at −10° C. and a dynamic deformation of 2.0%, the ground-gripping performance of the outsole improves increasingly. As shown in FIG. 5, the complex elastic modulus (E*) and the loss factor (tan δ) show a correlativity substantially. That is, the complex elastic modulus (E*) increases linearly with the loss factor (tan δ). It is known that in the strain dispersion of the dynamic viscoelasticity of rubber, as its loss factor (tan δ) becomes greater, its hysteresis friction with respect to an object with which it contacts becomes increasingly when it deforms. It is also known that as its complex elastic modulus (E*) becomes greater, its frictional force with respect to the object with which it contacts becomes increasingly great owing to edge effect when it deforms.

Figure 6:
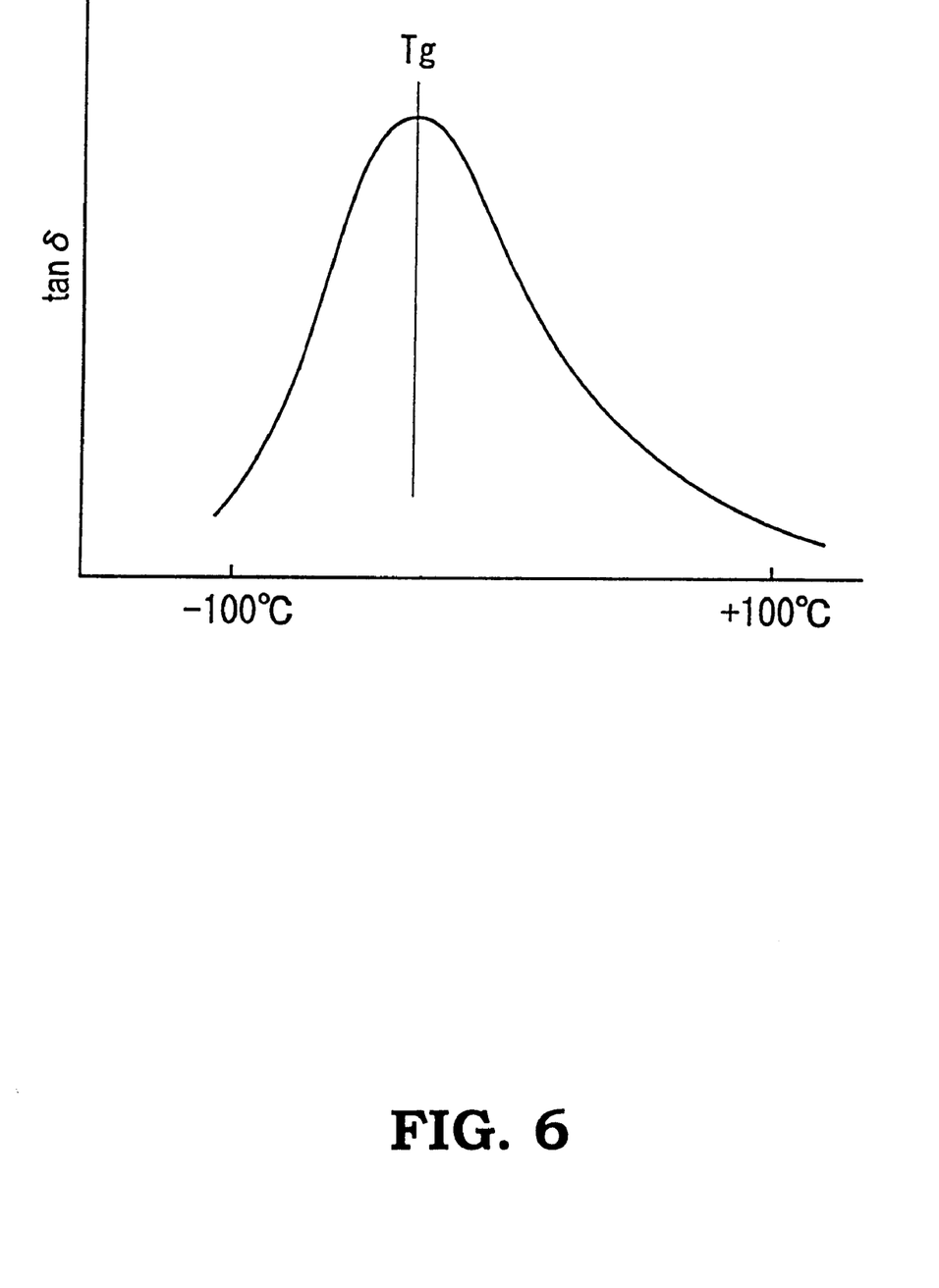
FIG. 6 shows the relationship between temperature of a vulcanized rubber composition and a loss factor (tan δ) thereof.

As a result of measurement of the loss factor (tan δ) of the vulcanized rubber in relation to temperature, as shown in FIG. 6, it has been revealed that the peak value of the loss factor (tan δ) at a temperature range of −100° C.–100° C. is coincident with a glass transition temperature (Tg) of base rubber composing the vulcanized rubber.

In the present invention, styrene-butadiene rubber having well-balanced mechanical characteristics and in particular high wear resistance is used as the main component of the base rubber. Based on the above-described knowledge, styrene-butadiene rubber having a glass transition temperature (Tg) close to −10 C. is used in the present invention. The styrene-butadiene rubber is vulcanized and molded to form an outsole. The resulting outsole has an increased complex elastic modulus (E*) and loss factor (tan δ) at −10° C. and at the dynamic deformation of 2.0%. Thus, the outsole has a much higher ground-gripping force than the conventional one.

That is, the present invention provides an outsole of shoes comprising molded vulcanized base rubber containing 70–100 wt % of styrene-butadiene rubber whose glass transition temperature (Tg) is higher than −33° C. and less than −10° C.

According to the above-described knowledge, it is preferable to use styrene-butadiene rubber having a glass transition temperature (Tg) close to −10° C. But it is difficult for the present polymerization technique to obtain styrene-butadiene rubber having such a high glass transition temperature (Tg). The styrene-butadiene rubber which is used in the present invention has a glass transition temperature higher than −34° C. which is the highest glass transition temperature of the conventional styrene-butadiene rubber used for the outsole. More specifically, NS116 (commercial name) [solution polymerization styrene-butadiene rubber, glass transition temperature (Tg): −25° C.] manufactured by Nippon Zeon Ltd. can be preferably used. In addition to NS116, it is favorable to form styrene-butadiene rubber whose glass transition temperature (Tg) is higher than −33° C. and close to −10° C. by so adjusting the composition ratio among components to be used to form the styrene-butadiene rubber in copolymerization, the copolymerization structure thereof, and molecular weights thereof that the mechanical characteristics thereof do not deteriorate. It is more favorable to use styrene-butadiene rubber having a glass transition temperature (Tg) higher than −30° C. and less than −10° C. It is most favorable to use styrene-butadiene rubber having a glass transition temperature (Tg) higher than −25° C. and less than −10° C. The styrene-butadiene rubber for use in the conventional outsole of shoes has mostly a glass transition temperature (Tg) in the range of −55° C.—−45 ° C. which is the glass transition temperature (Tg) range of the styrene-butadiene rubber for use in industrial rubber products such as tires and the like.

The glass transition temperature (Tg) of the styrene-butadiene rubber to be used as the base rubber of the outsole of the present invention is set to higher than −33° C. and lower than −10 ° C. The temperature-dependent viscoelasticity of the outsole formed by vulcanizing the base rubber has a peak value of the loss factor (tan$\delta$) in the temperature range higher than −33° C. and lower than −10° C. of the glass transition temperature (Tg) of the styrene-butadiene rubber of the present invention. Therefore, the loss factor (tan$\delta$) of the outsole of the present invention at the temperature of −10° C. is greater than that of the conventional outsole (molded vulcanized styrene-butadiene rubber whose glass transition temperature (Tg) is lower than −34° C.). Thus, at the dynamic deformation of 2.0% and at the temperature of −10° C., the loss factor (tan $\delta$) and complex elastic modulus (E*) of the outsole of the present invention are greater than those of the conventional outsole. That is, the outsole of the present invention has improved round-gripping performance. Consequently, the outsole grips the ground irregular and wet at a great force and thus has a high degree of slip prevention performance.

The loss factor (tan $\delta$) of the outsole of the present invention is favorably more than 0.26, more favorably more than 0.30, and most favorably more than 0.40 at a dynamic deformation of 2.0% and at −10° C. in strain dispersion of dynamic viscoelasticity at a frequency of 10 Hz. In this condition, the complex elastic modulus (E*) thereof is favorably more than 155 kgf/cm$^2$, more favorably more than 200 kgf/cm$^2$, and most favorably more than 260 kgf/cm$^2$. That is, for the ground, the outsole has a higher degree of hysteresis frictional force and edge effect-caused frictional force than the conventional outsole.

The greater the loss factor (tan $\delta$) and the complex elastic modulus (E*) are, the higher the gripping performance are. If the gripping performance is too high, shoes do not slip at all and consequently, the ankle may be sprained or the like. Thus, the loss factor (tan $\delta$) is favorably less than 1.5, more favorably less than 1.2, and most favorably less than 1.0. If the complex elastic modulus (E*) is too great, the shock absorption property thereof deteriorates. Thus, the complex elastic modulus (E*) is favorably less than 750 kgf/cm$^2$ and more favorably less than 600 kgf/cm$^2$.

When the glass transition temperature (Tg) of the styrene-butadiene rubber to be used for the outsole of the present invention is higher than −33° C. and lower than −10° C., both oil-extended rubber and oil-unextended rubber can be used. But the oil-unextended rubber is more favorable than the oil-extended rubber in consideration of the color-clearness of the outsole and environmental pollution. More specifically, most of the oil-extended rubber has a high degree of blackness because of oil contained therein, which deteriorates the color-clearness of the outsole. Further, the oil contained in the oil-extended rubber consists of aromatic oil which pollutes the environment. Thus, the present tendency is to stop the use of the aromatic oil.

It is preferable to use styrene-butadiene rubber having a copolymerization composition in which the combination amount of styrene is 15–25 wt % and the combination amount of butadiene is 35–70 wt %. By using the styrene-butadiene rubber having the above-described copolymerization composition, the vulcanized rubber has a high tensile strength, wear resistance, and stability. Consequently, the outsole has a high degree of ground-gripping performance for a long time.

If the entire base rubber is not composed of the styrene-butadiene rubber whose glass transition temperature (Tg) is higher than −33° C. and lower than −10° C., the base rubber is composed by mixing styrene-butadiene rubber with one or more of following rubbers: natural rubber (NR), isoprene (IR), butadiene rubber (BR), acrylonitrile-butadiene rubber (NBR), ethylene-propylene-diene rubber (EPDM), chloroprene rubber (CR), butyl rubber (IIR), acrylic rubber (ACM), urethane rubber, and the like.

As vulcanizing agent for vulcanizing the base rubber, sulfur, organic sulfur-containing compounds, organic peroxide, quinone dioximes, and the like are used. It is favorable to use 1–3 parts by weight of the vulcanizing agents and more favorable to use 1.5–2.5 parts by weight thereof per 100 parts by weight of the base rubber. A vulcanization accelerator may be used in the case where sulfur, organic sulfur-containing compounds or the like is used as the vulcanizing agent. The vulcanization accelerator includes inorganic accelerators such as slaked lime, magnesia (MgO), litharge (PbO); and organic accelerators such as a thiazole vulcanization accelerator, a sulfonamide vulcanization accelerator, a thiuram vulcanization accelerator, a dithiocarbamate vulcanization accelerator. It is favorable to use 0.5–4 parts by weight of these vulcanization accelerator and more favorable to use 1–2.5 parts by weight thereof per 100 parts by weight of the base rubber. A vulcanization acceleration assistant may be added to the base rubber. The vulcanization acceleration assistant includes a metal compound such as zinc white; and aliphatic acid such as stearic acid, oleic acid, cotton seed aliphatic acid. It is favorable to use 1–5 parts by weight of these vulcanization acceleration assistants and more favorable to use 1–3 parts by weight thereof per100 parts by weight of the base rubber. Further, it is possible to add an age resistor and a softener (plasticizer) may be added to the base rubber appropriately.

A filler such as silica, carbon or the like may be added to the base rubber to adjust the viscoelasticity of the vulcanized rubber, to impart wear resistance thereto, and adjust the hardness thereof. Further, a silane coupling agent or sililation reagent may be added to the base rubber to impart water repellency to the vulcanized rubber and adjust the viscoelasticity and the like thereof.

According to the present invention, in molding the base rubber to produce the outsole, the vulcanizing agent and various compounding agents are added to the base rubber as necessary and then, they are kneaded. Then, a mixture obtained by kneading them is put in a forming die to mold and vulcanize it simultaneously to thereby form the outsole. As another method, it is possible to vulcanize the base rubber in the stage in which the base rubber, the vulcanizing agent, and the compounding agents are kneaded and then mold obtained vulcanized rubber by putting it in the forming die. As the molding method, injection molding, press molding or the like can be used.

It is preferable to form a plurality of blocks on the bottom surface of the outsole by defining the bottom surface with grooves so that only outer surfaces of convex parts contact the ground. Each block can be shaped as a square pillar, a pyramid, a column, a truncated cone or a combination of a plurality of square pillars or/and a plurality of columns by making the flank of each block perpendicular or oblique to the bottom surface of the groove. Normally, the part of its bottom surface corresponding to the arch of the foot is concave to prevent it from contacting the ground. Thus, the grooves and the blocks of the outsole of the present invention are formed on its bottom surface such that they are positioned in the part supporting the region from the tiptoe to the back side of the instep and the part supporting the heel.

It is preferable to set the depth of the groove, namely, the height of each block to 2–7 mm. In this range of the depth, the blocks deform favorably according to the shape of an irregular surface of the ground. That is, in this range of the depth, the outsole has a higher degree of gripping performance. Further, it is possible to effectively lighten shocks to be applied to the foot, allow a user to feel comfortable to wear, and improves repulsion property in taking exercise.

The outsole of the present invention is suitably applied to trekking shoes intended to be used on rocky ground. But the outsole can be preferably applied to fishing boots, diving shoes, motorbike shoes, bath shoes, rain shoes, beach sandals, and the like which are used in places always or frequently wet.

EXAMPLES

The examples of the present invention will be described in detail below in comparison with comparison examples.

For each of first through third examples and first through third comparison examples, a mixture of the components shown in table 1 shown below was prepared by kneading them. Each of the mixtures was put in a forming die for vulcanization at 160° C. for 10 minutes to prepare a test piece, namely, an outsole of each of the examples and the comparison examples.

Figure 1:
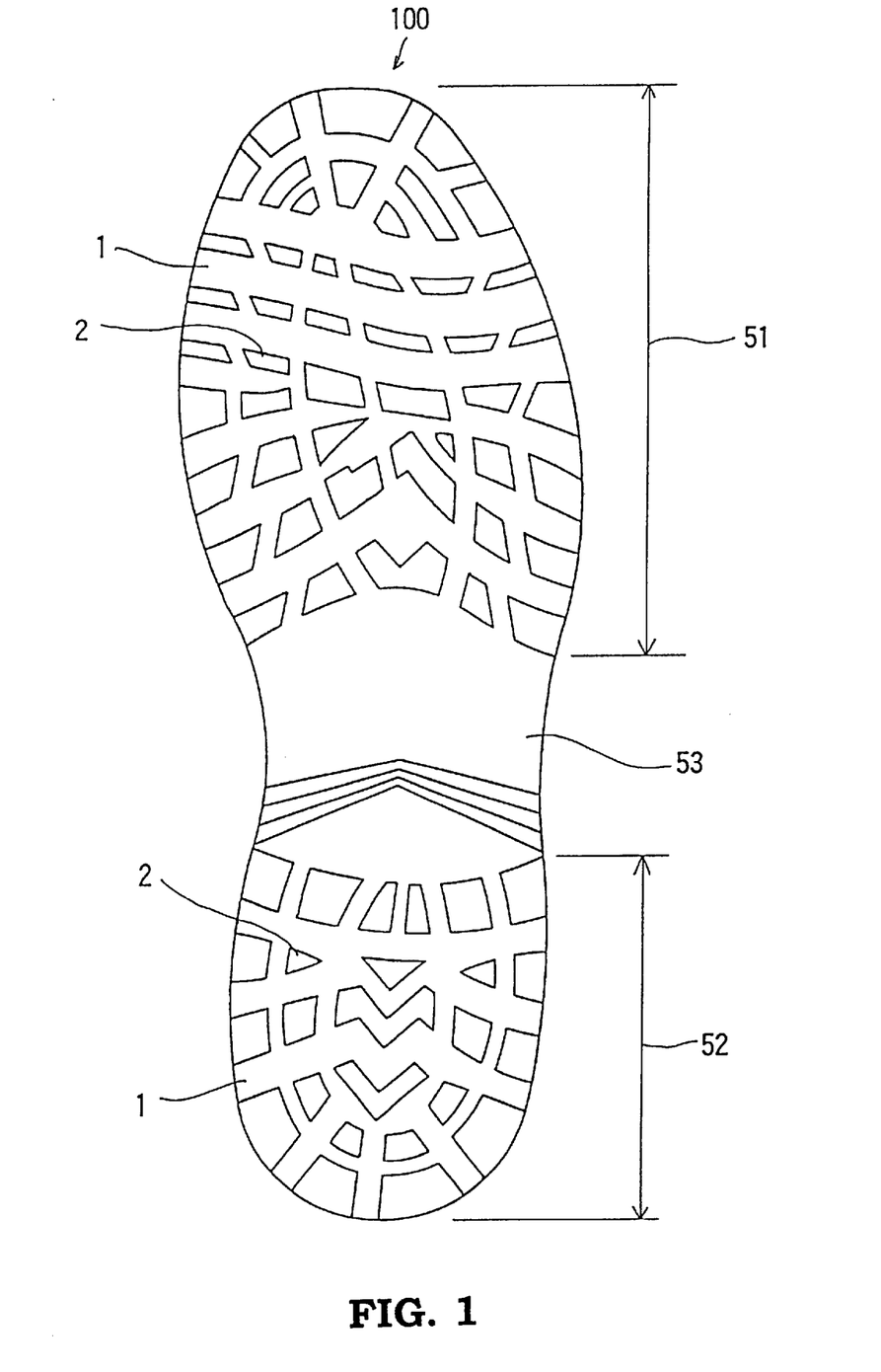
FIG. 1 is a bottom view showing an outsole of an embodiment of the present invention.
Figure 2:
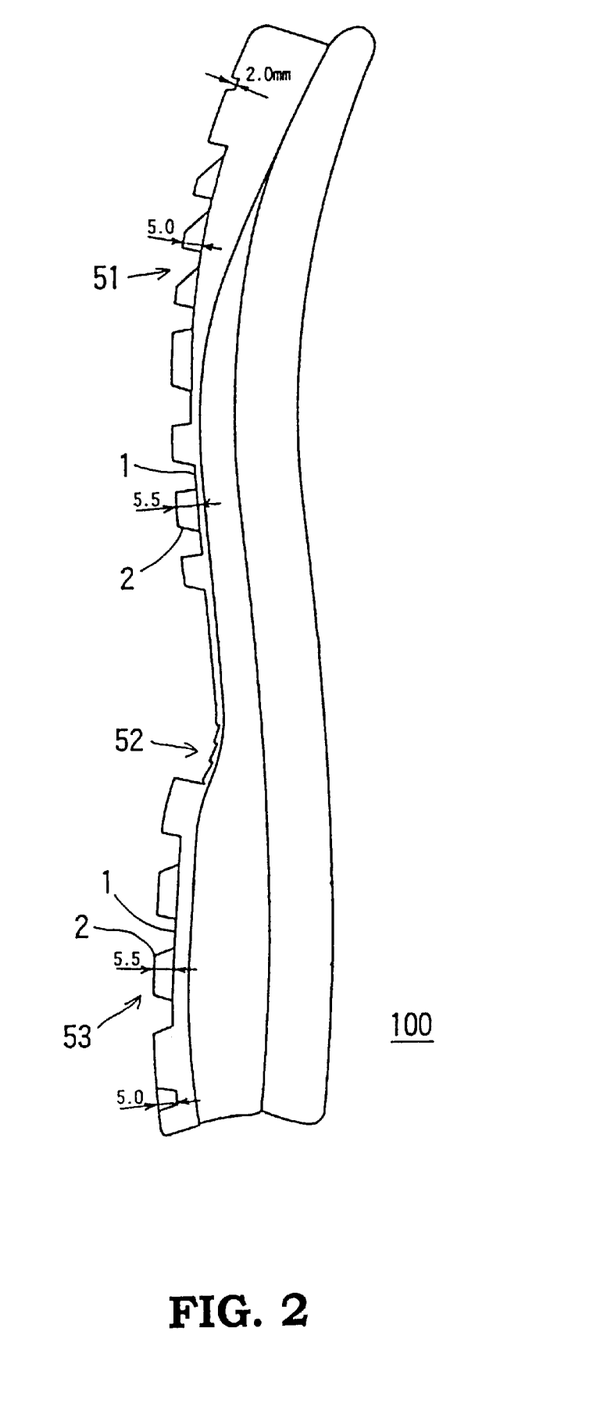
FIG. 2 is a side view showing the outsole shown in FIG. 1.

The shape of each test piece was as shown in FIGS. 1 and 2. That is, a test piece 100 included a first part 51 supporting the region from the tiptoe to the back side of the instep, a second part 52 supporting the heel, and an arch-of-the-foot part 53 connecting the first part 51 and the second part 52 with each other. A plurality of grooves 1 having widths of 1–20 mm and depths of 2.0–5.5 mm were formed lengthwise, widthwise, and obliquely in the first part 51 and the second part 52 to form a plurality of blocks 2 having various configurations. The area of the entire bottom surface of the test piece was set to 250 $cm^2$. The area of the bottom surface of each block 2 is set to the range of 0.1–8 $cm^2$. The total area of the bottom surface of the blocks 2 is 65 $cm^2$. The arch-of-the-foot part 53 is concave to prevent it from contacting the ground.

TABLE 1

|  | example | | | comparison example | | |
| --- | --- | --- | --- | --- | --- | --- |
|  | 1 | 2 | 3 | 1 | 2 | 3 |
| SBR *1 | 100 | 75 | 70 | 60 | — | — |
| SBR *2 | — | — | — | — | 100 | — |
| SBR *8 | — | — | — | — | — | 100 |
| BR *3 | — | 25 | 30 | 40 | — | — |
| filler | 50 | 50 | 50 | 50 | 50 | 50 |
| silane coupling agent *4 | 5 | 5 | 5 | 5 | 5 | 5 |
| plasticizer *5 | 5 | 5 | 5 | 5 | 5 | 5 |
| zinc oxide | 3 | 3 | 3 | 3 | 3 | 3 |
| stearic acid | 1 | 1 | 1 | 1 | 1 | 1 |
| age resistor *6 | 2 | 2 | 2 | 2 | 2 | 2 |
| sulfur | 2 | 2 | 2 | 2 | 2 | 2 |
| accelerator *7 | 1 | 1 | 1 | 1 | 1 | 1 |
| Tg (SBR) | −25 | −25 | −25 | −25 | −55 | −39 |
| E* | 600 | 350 | 260 | 150 | 100 | 152 |
| tan δ | 1.00 | 0.55 | 0.40 | 0.25 | 0.20 | 0.24 |
| gripping index | 180 | 150 | 145 | 100 | 90 | 98 |
| feeling index | 4.9 | 4.5 | 4.3 | 3.0 | 2.6 | 2.9 |

*1: Solution polymerization styrene-butadiene rubber [glass transition temperature (Tg): −25° C., amount of styrene: 21%, amount of vinyl: 63%], NS116 (commercial name) manufactured by Nippon Zeon Ltd.
*2: Emulsion polymerization styrene-butadiene rubber [glass transition temperature (Tg): −55° C., amount of styrene: 23.5%, amount of vinyl: 20%], SBR1502 (commercial name) manufactured by Nippon Goseigomu Ltd.
*3: Butadiene rubber [glass transition temperature (Tg): −110° C.], BR11 (commercial name) manufactured by Nippon Goseigomu Ltd.
*4: Silane coupling agent [bis-(3-triethoxysilyl propyl) tetrasulfon] Si69 (commercial name), Degussa Ltd.
*5: Process oil PW380 (commercial name) manufactured by Idemitsu Kosan Ltd.
*6: nocrac 200 (commercial name) manufactured by Ouchi Shinko Chemical Industry Ltd.
*7: nocceler NS (commercial name) manufactured by Ouchi Shinko Chemical Industry Ltd.
*8: solution polymerization styrene-butadiene rubber [glass transition temperature (Tg): −39° C., amount of styrne: 25%, amount of vinyl: 39.5%], SE9191 (commercial name) manufactured by Sumitomo Kagaku Ltd.

The loss factor (tan δ) and the complex elastic modulus (E*) of the test piece of each of the example and the comparison examples thus prepared were measured at −10° C. and at a dynamic deformation of 2.0% in strain dispersion of dynamic viscoelasticity thereof at a frequency of 10 Hz. The gripping index of each test piece indicating the slip prevention performance thereof was also measured.

Trekking shoes were prepared by installing test pieces on shoes bodies to conduct monitor tests.

The loss factor (tan δ) and the complex elastic modulus (E*) of each test piece were measured with a spectrometer (VA-200 of modified type) manufactured by Shimazu Seisakusho Ltd.

Figure 3:
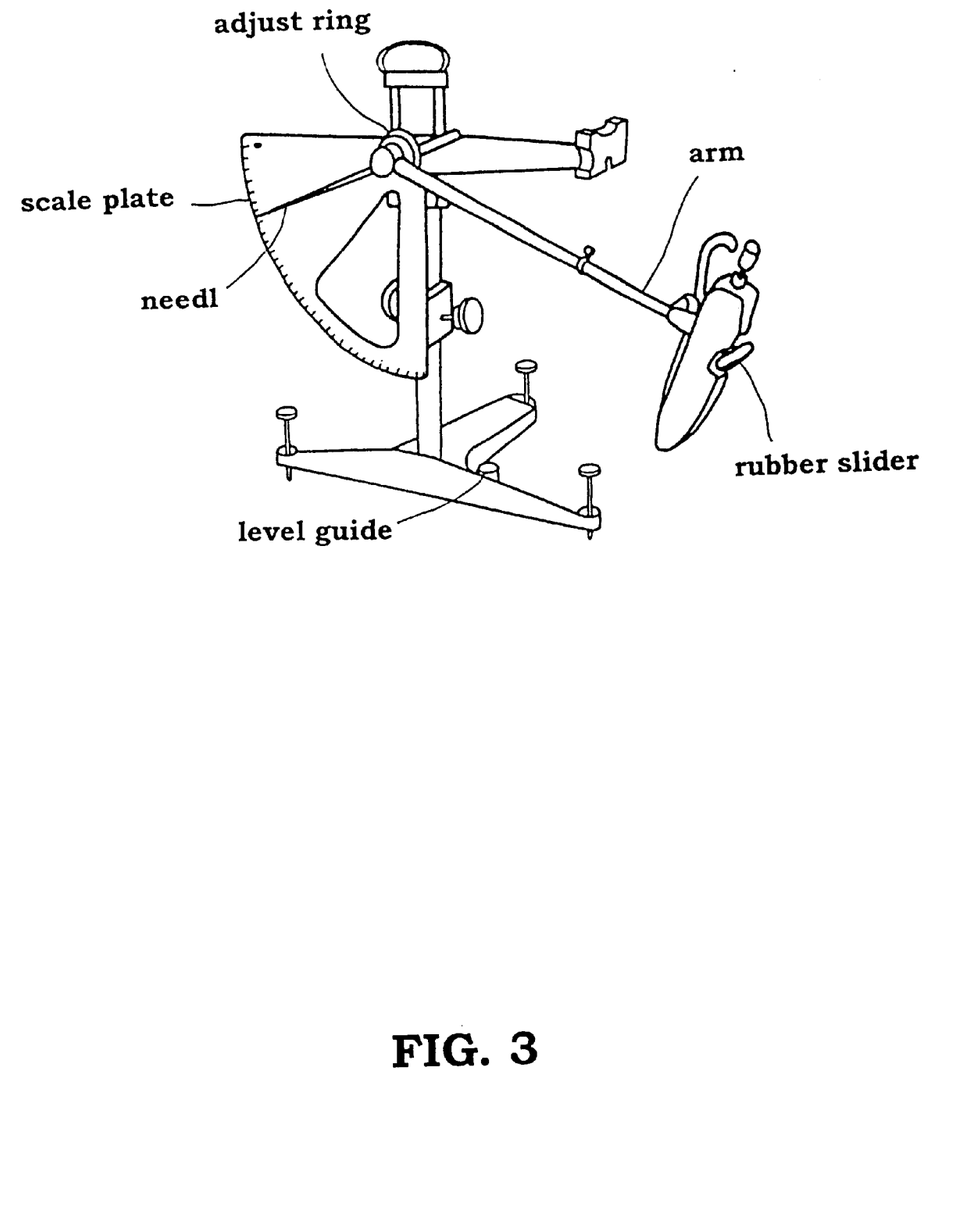
FIG. 3 is a perspective view showing a portable skid resistance tester.
Figure 4:
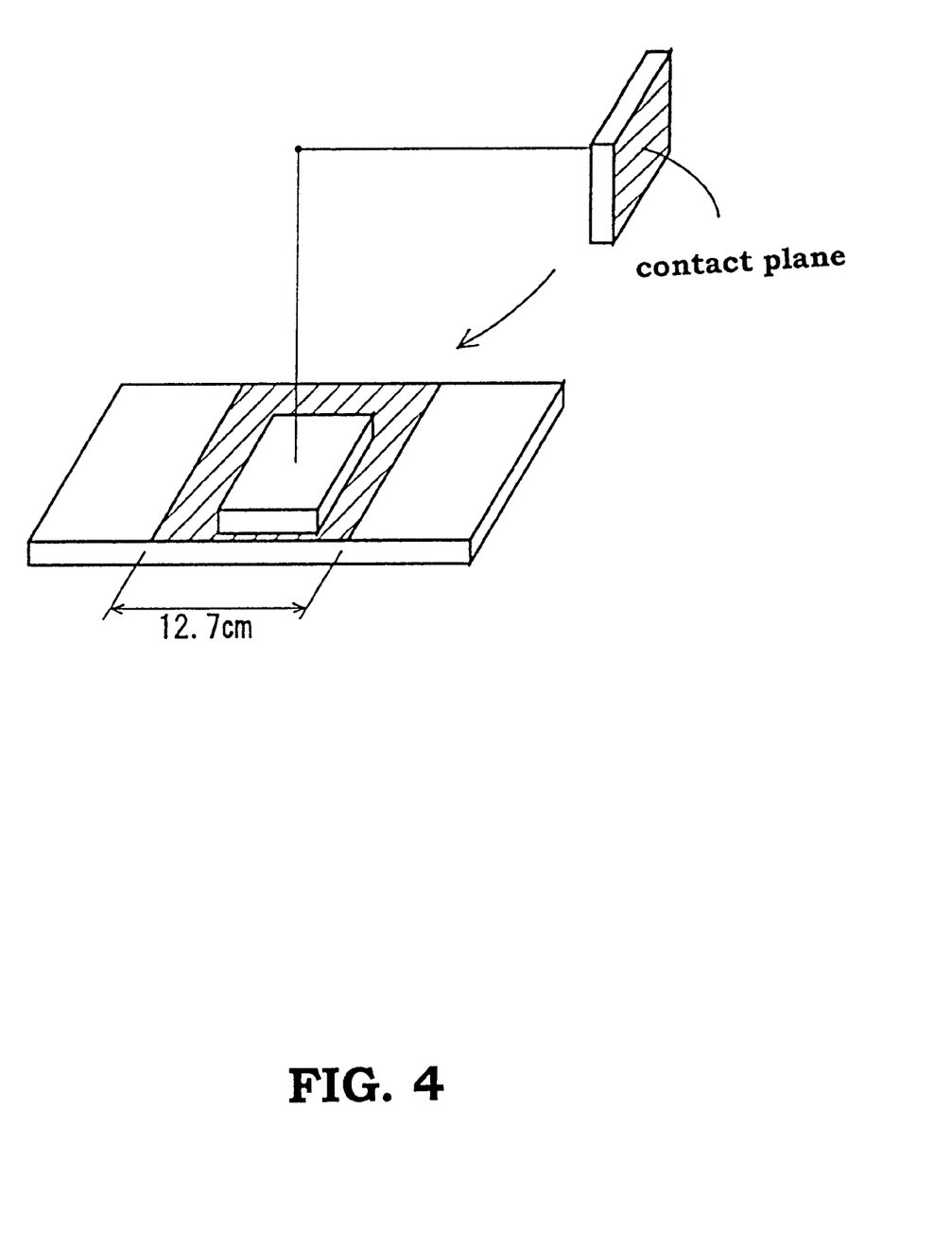
FIG. 4 is a schematic view showing a measuring condition to be used in measuring a friction resistance by using the portable skid resistance tester shown in FIG. 3.

To measure the gripping index of each test piece cut to a predetermined shape (76 mm×25 mm×6 mm), a relative friction resistance thereof was measured, using a portable skid resistance tester shown in FIG. 3. The friction resistance thereof was measured by frictionally sliding each test piece on wet rocky ground. In the test, a rubber-provided pendulum was swung downward from a predetermined level to read the level of the pendulum which was swung upward after it frictionally contacted the wet rocky ground. As shown in FIG. 4, the contact length of each test piece with the wet rocky ground was set to 12.7 cm. The gripping index of each test piece was evaluated relative to a reference value 100 which was set as the friction resistance of the test piece of the first comparison example.

In a monitor test, wearing trekking shoes of each of the examples and comparison examples, 10 testers trekked on the wet rocky ground. The feeling the testers had for the test pieces was evaluated organoleptically by means of five-point method. In the test, the ground-gripping property thereof was examined as the most important item.

In the test pieces of the first through third examples, the loss factors (tan δ) thereof were more than 0.40, the complex elastic moduli (E*) thereof were more than 260, and the gripping indexes thereof were more than 145. Marks given by the testers who wore the test pieces were more than 4.3. That is, the test piece of each of the first through third examples had a high degree of slip prevention performance on the wet rocky ground and made the testers feel that shoes to which the test pieces were applied were comfortable to wear.

In the test piece of the first through third comparison examples, the loss factors (tan δ) thereof were less than 0.25, the complex elastic moduli (E*) thereof were less than 152, and the gripping indexes thereof were less than 100. Marks given by the testers who used the test pieces were less than 3.0. That is, the test piece of each of the first through third comparison examples did not have a high degree of slip prevention performance on the wet rocky ground.

As apparent from the foregoing description, according to the outsole of shoes of the present invention, the outsole comprises molded vulcanized base rubber containing 70–100 wt % of styrene-butadiene rubber whose glass transition temperature (Tg) is higher than −33 ° C. and less than −10° C. Therefore, at a dynamic deformation of 2.0% and at −10° C., the loss factor (tan δ) and the complex elastic modulus (E*) of the outsole of the present invention are greater than those of the conventional outsole. That is, the outsole of the present invention has a very high degree of ground-gripping force. Consequently, the outsole of the present invention does not slip on ground irregular and wet owing to its high ground-gripping force and has high degree of slip prevention performance. Thus, the outsole can be suitably used for trekking shoes.

What is claimed is:

1. An outsole of shoes comprising molded vulcanized rubber material which contains base rubber, wherein the base rubber contains 70–100 wt % of styrene-butadiene rubber whose glass transition temperature (Tg) is higher than −33° C. and less than −10° C., a dynamic deformation of 2.0% and −10° C. in strain dispersion of dynamic viscoelasticity at a frequency of 10 Hz, a loss factor (tan δ) is more than 0.26 and less than 1.5, and a complex elastic modulus (E*) is more than 150 kgf/cm$^2$ and less than 750 kgf/cm$^2$.

2. An outsole of shoes comprising molded vulcanized rubber material which contains base rubber, wherein the base rubber contains 70–100 wt % of styrene-butadiene rubber whose glass transition temperature (Tg) is higher than −33° C. and less than −10° C., a dynamic deformation of 2.0% and −10° C. in strain dispersion of dynamic viscoelasticity at a frequency of 10 Hz, a loss factor (tan δ) is more than 0.26 and less than 1.5, a complex elastic modulus (E*) is more than 150 kgf/cm$^2$ and less than 750 kgf/cm$^2$, a combination amount of styrene is 15–25 wt %, and a combination amount of vinyl is 35–70 wt %.

3. The outsole of shoes according to claim 2, wherein at a dynamic deformation of 2.0% and −10° C. in strain dispersion of dynamic viscoelasticity at a frequency of 10Hz, a loss factor (tanδ) is more than 0.26 and less that 1.5, and a complex elastic modulus (E*) is more than 150 kgf/cm$^2$ and less than 750 kgf/cm$^2$.

* * * * *